United States Patent
McLellan (10) Patent No.: US 8,849,807 B2
(45) Date of Patent: Sep. 30, 2014

(54) ACTIVE SEARCH RESULTS PAGE RANKING TECHNOLOGY

(76) Inventor: Mark F. McLellan, Middletown, DE (US)

( * ) Notice: Subject to any disclaimer, the term of this patent is extended or adjusted under 35 U.S.C. 154(b) by 606 days.

(21) Appl. No.: 13/114,774

(22) Filed: May 24, 2011

(65) Prior Publication Data

US 2011/0295826 A1    Dec. 1, 2011

Related U.S. Application Data (60) Provisional application No. 61/347,905, filed on May 25, 2010.

(51) Int. Cl.
*G06F 17/30* (2006.01)

(52) U.S. Cl.
CPC ............... *G06F 17/30867* (2013.01)
USPC .......................................... 707/723

(58) Field of Classification Search
None
See application file for complete search history.

(56) References Cited

U.S. PATENT DOCUMENTS

| | | | |
|---|---|---|---|
| 6,006,218 A | 12/1999 | Breese et al. |
| 6,012,053 A | 1/2000 | Pant et al. |
| 6,078,914 A | 6/2000 | Redfern |
| 6,078,916 A | 6/2000 | Culliss |
| 6,125,361 A | 9/2000 | Chakrabarti et al. |
| 6,253,198 B1 | 6/2001 | Perkins |
| 6,285,999 B1 | 9/2001 | Page |
| 6,311,178 B1 | 10/2001 | Bi et al. |
| 6,327,590 B1 | 12/2001 | Chidlovskii et al. |
| 6,397,212 B1 | 5/2002 | Biffar |
| 6,434,548 B1 | 8/2002 | Emens et al. |
| 6,490,577 B1 | 12/2002 | Anwar |
| 6,546,388 B1 | 4/2003 | Edlund et al. |
| 6,574,632 B2 | 6/2003 | Fox et al. |
| 6,631,372 B1 | 10/2003 | Graham |
| 6,654,749 B1 | 11/2003 | Nashed |
| 6,665,666 B1 | 12/2003 | Brown et al. |
| 6,671,681 B1 | 12/2003 | Emens et al. |
| 6,701,318 B2 | 3/2004 | Fox et al. |
| 6,714,929 B1 | 3/2004 | Micaelian et al. |
| 6,718,324 B2 | 4/2004 | Edlund et al. |
| 6,766,320 B1 | 7/2004 | Wang et al. |
| 6,795,820 B2 | 9/2004 | Barnett |
| 6,854,074 B2 | 2/2005 | McLellan et al. |
| 7,003,513 B2 | 2/2006 | Geiselhart |

(Continued)

FOREIGN PATENT DOCUMENTS

| EP | 1517250 A1 | 3/2005 |
|---|---|---|
| WO | 01/46776 A2 | 6/2001 |

(Continued)

OTHER PUBLICATIONS

Web Developer's Journal—Engine Submission URLs, http://webdevelopersjournal.com/articles/engine_submission_URLs.html, Visited on Sep. 10, 2009.

(Continued)

*Primary Examiner* — Alexey Shmatov
(74) *Attorney, Agent, or Firm* — Gerry J. Elman; Elman Technology Law, P.C.

(57) ABSTRACT

Systems and methods for storing data regarding activities of a person and/or people associated with a website that is indexed in a search engine. Data regarding such activities is used to calculate a weighting factor that is combined with a relevance score for the website. The combined weighting factor and relevance score influences the relative position of the website among other websites in search results.

5 Claims, 6 Drawing Sheets

(56) References Cited

U.S. PATENT DOCUMENTS

| | | |
|---|---|---|
| 7,058,628 B1 | 6/2006 | Page |
| 7,072,888 B1 | 7/2006 | Perkins |
| 7,188,106 B2 | 3/2007 | Dwork et al. |
| 7,194,458 B1 | 3/2007 | Micaelian et al. |
| 7,246,107 B2 | 7/2007 | Nakamura et al. |
| 7,295,995 B1 | 11/2007 | York et al. |
| 7,308,442 B2 | 12/2007 | Takahashi et al. |
| 7,330,849 B2 | 2/2008 | Gerasoulis et al. |
| 2003/0120654 A1 | 6/2003 | Edlund et al. |
| 2003/0123443 A1 | 7/2003 | Anwar |
| 2003/0217047 A1 | 11/2003 | Marchisio |
| 2004/0083127 A1 | 4/2004 | Lunsford et al. |
| 2005/0071465 A1 | 3/2005 | Zeng et al. |
| 2005/0149502 A1 | 7/2005 | McSherry |
| 2005/0234877 A1 | 10/2005 | Yu |
| 2005/0246328 A1 | 11/2005 | Zhang et al. |
| 2006/0136411 A1 | 6/2006 | Meyerzon et al. |
| 2007/0016574 A1 | 1/2007 | Carmel et al. |
| 2007/0038608 A1 | 2/2007 | Chen |
| 2007/0061297 A1 | 3/2007 | Bihun et al. |
| 2007/0124263 A1 | 5/2007 | Katariya et al. |
| 2007/0260598 A1 | 11/2007 | Odom |
| 2007/0260601 A1 | 11/2007 | Thompson et al. |
| 2008/0250009 A1 | 10/2008 | Xie et al. |
| 2009/0327281 A1 | 12/2009 | Young et al. |

FOREIGN PATENT DOCUMENTS

| | | |
|---|---|---|
| WO | 2006/119479 A2 | 11/2006 |
| WO | 2006/119481 A2 | 11/2006 |
| WO | 2007/038389 A2 | 4/2007 |

OTHER PUBLICATIONS

DotCom Design Studio—Maximum Impact—Search Engine Optimization, http://www.dotcomdesignstudio.com/dot-com-root/dot-comdocuments/InfoPack-SEO.pdf, Visited on Sep. 10, 2009.

Tips and Tricks to Optimize your Website for Best Results in Search Engines, http://www.wizarddesign.com.au/pdf/WWD%20Search%20Engine%20Optimisation.pdf, Visited on Sep. 10, 2009.

SEO in House Checklist & Recommendation, http://ezinearticles.com/?SEO-in-House-Checklist-and-Recommendation&id=1031927, Visited on Sep. 10, 2009.

Manta—User Registration, http://www.manta.com/member/register/?rl=learnmore, Visited on Sep. 10, 2009.

Manta—Adding Information to a Company Profile, http://www.manta.com/coms2/page_howto_add_to_company_profile, Visited on Sep. 10, 2009.

The Top 10 Ways to Protect Yourself from E-Venge, http://www.thisisbrandx.com/2009/09/the-top-10-ways-to-protect-yourself-from-evenge.html, Visited on Sep. 13, 2009.

How to Delete Unwanted Online Accounts Easily, http://www.makeuseof.com/tag/how-to-delete-unwanted-online-accounts-easily/, Visited on Sep. 13, 2009.

Yahoo! Terms of Service, http://info.yahoo.com/legal/us/yahoo/utos/utos-173.html, Visited on Sep. 13, 2009.

FIG. 6

ACTIVE SEARCH RESULTS PAGE RANKING TECHNOLOGY

CROSS-REFERENCE TO RELATED APPLICATIONS

This application claims the benefit under 35 U.S.C. §119 from U.S. Provisional Patent Application 61/347,905 filed May 25, 2010, the entire contents of which are incorporated herein by reference.

TECHNICAL FIELD

The present invention relates generally to managing, cataloging, and displaying information, and more particularly to methods and systems for managing, cataloging, and displaying information on a global communications network.

BACKGROUND OF THE INVENTION

There exists a global system of interconnected computer networks through which information stored on one computer can be requested by and transmitted to another computer. This global system of interconnected computer networks, known as the Internet, and the methods by which information is requested and transmitted, was originally developed through funding from the Advanced Researched Projects Agency, a branch of the United States government, in the 1960s. Over time, software developers utilized the Internet as a framework upon which to develop software for specific purposes and to transmit information for each purpose in a particular way. These methods of communication were and are still known as protocols. For instance, the transfer of a file from one computer to another took place in the file transfer protocol ("FTP"). Software that mimicked the way mail is sent from one person to another person, but in an electronic form, operated using the simple mail transfer protocol ("SMTP").

In the 1990's scientists at the European Organization for Nuclear Research ("CERN") developed a framework for storing, requesting, and transmitting information in what is known as the hypertext markup language ("HTML") and the corresponding hypertext transfer protocol ("HTTP"). This system is built on top of the communications framework of the Internet. The core feature of this particular system is to store and present documents ("webpages") in an electronic form that contains references ("links") to other such documents. Each link contains a Uniform Resource Locator ("URL") which essentially is the address, in the HTTP format, of a particular document being linked to. From a topology perspective, the system of documents or files (again, "webpages") and the computers containing or hosting the collections of documents ("websites") formed a web, and the system was appropriately named the World Wide Web ("WWW") or Web, for short.

The software for viewing and requesting the information available on the World Wide Web began as crude text-only programs called web browsers. Though the early web browsers fulfilled the function of allowing a person to move from one document to another, through links, the ability to display non-text information, such as pictures, inline with the text was unavailable.

In 1993, a student at the University of Illinois named Marc Andreessen developed a landmark web browser called Mosaic that included the ability to show pictures in-line with the text of a document. Later Marc Andreessen, and entrepreneur, Jim Clark, formed a company called Netscape Communications Corporation ("Netscape"). Netscape developed an improved web browser along with a protocol, the secure sockets layer ("SSL") for communicating sensitive information in a secure manner, as well a programming language known as JavaScript, which could be included in the HTML of a webpage to give the webpage more functionality.

Netscape's web browser popularized the World Wide Web because of the rich manner in which webpages could be presented. Businesses formed around the World Wide Web, offering all manner of services, and the amount of information stored on and accessible through the World Wide Web increased dramatically.

Identifying the need for technology to catalog and organize the developing body of information on the World Wide Web, companies such as Yahoo! Inc. developed computer programs that would seek out the information available on the World Wide Web by methodically copying the content of webpages stored on websites and index this content in their own databases. Early efforts at cataloging the information on World Wide Web resulted in webpages that presented a directory of broad topics, each of which was a link to another web page with more specific topics. By traversing through the directory structure, a person would eventually be led to a specific webpage. Later, companies such as Google, Inc. and Yahoo! Inc. developed systems and methods for determining the relevance, represented by a numerical score, of the content of any webpage with respect to a given keyword or set of keywords. The ability to assign a score to the relevance of a particular webpage to a keyword or set of keywords made it possible to rank webpages by their relevance to any given keywords. Systems with this capability came to be known as search engines. Search engines allow a person (the end user) to view the webpage of a company running a search engine, submit a keyword or set of keywords, and receive a listing of webpages ("search results") ranked by their relevance to the keyword(s). Each item in the list presented to the end user includes a link to a webpage, so that simply clicking on the item in the list causes the web browser to request, receive, and present to the person, the content of the webpage.

The above-described method of ranking search results by the relevance of the content of webpages to given keywords has come to be known in the art as organic or natural search results. Another method of ranking search results that is commonly employed by companies running search engines is known as sponsored or paid results. Using the sponsored-results method, search engines present search results based on the financial arrangement a website owner has made with the company running the search engine to associate a webpage with one or more keywords.

SUMMARY OF THE INVENTION

The present disclosed subject matter is directed to computer systems and computer-executable methods for 1) detecting, tracking, and recording data that indicates that a person, company, or entity is actively maintaining, updating, and generally promoting a website and 2) combining this data with a computer-calculated keyword relevance score to adjust the website's ranking relative to other websites in a listing of search results. This improvement over the prior art overcomes the problem of people being presented with search results containing highly ranked websites which contain keyword-irrelevant content, under the sponsored results model, and/or websites that are outdated and/or unsupported by anyone, under the organic results model. The systems and methods of the present invention, for purposes of this disclosure, shall be referred to as "Active Search Results" ("ASR").

Because sponsored results systems are based not on the content of a webpage, but on the amount that the Promoter pays to have certain keywords associated with a webpage, the webpages that the End User sees in the search results do not necessarily match the keywords that the End User is searching with. (Terms used herein with initial capital letters are defined below.) Organic searching provides a match that is closer with respect to the keywords that are searched for, but one major deficiency is that the site could be outdated. This deficiency could also be common with the paid search results sites. The content on the site could match the content that is searched but the website might not be current. For example, when someone is searching with a search engine and clicks on a search result, it is possible that no one associated with the returned website is:

1. Promoting the site
2. Updating the site with current content
3. Supporting the site
4. Providing customer support
5. Providing product support
6. Taking phone calls and/or answering emails
7. Providing feedback to visitors and/or customers An analogy to such a website would be a big store with only one or no employees to serve the customers, or a store which is going out of business or is already out of business.

Throughout this disclosure, the terms "site," "website," "web site," "webpage," and "web page" are used interchangeably to refer to a source of information, entertainment, advertisements, or other content accessible on the World Wide Web ("WWW") at a particular URL (defined below). A website often contains a collection of files or webpages, including a beginning file or webpage called a home page, and typically, additional files or webpages. Also, it should be understood that "search results" as used in this disclosure refers to a listing of webpages presented to a person after the person enters a keywords and/or other search criteria into a search engine. In addition, the following definitions are helpful in understanding the invention:

DEFINITIONS

Activity—An action or event that increases or decreases the Total Activity Weight of a website according to the systems and methods of the present invention.

Active Search Results ("ASR")—The systems and methods of the present invention.

Active Search Results Identifier ("ASRID")—An identifier specified in a Meta Tag or other electronic means to signify to search engines and other ASR-affiliated sites using ASR that a certain Promoter is associated with a webpage or other electronic activity. An ASRID allows a Promoter to not reveal any personally identifiable information to the general public, while having the benefit of the search engine indexing the webpage based on the Promoter's Activities.

Activity Weight—A value that determines how strongly a particular Activity increases or decreases the Total Activity Weight associated with a given Promoter.

Ad Impression—This is an instance of an advertisement being presented to an End User.

ASR Affiliated Site ("ASRAS")—This term refers to the website of an entity that has affiliated with the ASR Operator. An ASRAS provides Promoters with opportunities to perform Activities through the ASRAS. The ASRAS records the performance of these Activities and reports them to ASR Operator.

Active Search Results ("ASR") Operator—This is an entity, and more specifically, a Search Engine Company, that offers the functionality of the present invention to Promoters and End Users.

Click—This refers to the act of a person activating an on-screen item, such as a link on a website, typically by moving a mouse pointer over the displayed item and pressing a button on the mouse to activate the item. In the context of this disclosure, a click is usually in reference to an on-screen link that a person activates. Clicking on a link causes a web browser displaying the link to request data from a URL (defined below) associated with the link.

Click Through—This term refers to the instance when an End User is presented with an advertisement and the End User clicks on a link associated with the advertisement, generally with the purpose to learn more about the product or service being advertised.

End User—This term refers to a person that is using a search engine to search for information.

Meta Tag—Structured text in the source code of a webpage that includes instructions and keywords for Spiders. See below for a definition of "Spider."

Promoter—This term refers to a person or entity that seeks to increase the visibility and prominence of a particular website. A non-exhaustive list of Promoters is the owner of a website, an employee of a company that owns/operates the website, or an outside consultant or company tasked with maintaining or increasing the prominence of the website.

Relevance—A value representing how closely the content of a website matches the parameters and/or keywords of a search query.

Search Engine Company—A company or entity that provides a search engine to End Users. Examples are Google Inc., Yahoo! Inc., and Microsoft Corporation.

Search Engine Optimization ("SEO")—This term refers to a set of practices for increasing the ranking of a website in organic search results returned to an End User.

Search Engine Optimization Company ("SEO Company")—This is a company or entity that performs Search Engine Optimization on one or more websites so that search engine Spiders can understand and index the content better, thereby making the website "Search Engine Friendly." Search Engine Optimization Companies typically perform this task for a fee.

Search Engine Submission Company ("SES Company")—This is a company or entity that submits websites to search engines on behalf of a Promoter. An SES Company typically performs this task for a fee.

Spider—This is a computer program that accesses the World Wide Web and then visits and downloads the content of one or more websites to a local copy. The content is then available for indexing by a search engine.

Social Network—The term "social network" means, in the database of a system that manages relationships between people on a global communications network, a set of people, each having a profile on the service and whose profiles are linked directly or indirectly to one another. The social network of any particular person is the set of people whose profiles are linked directly or indirectly to that person's profile. A direct link between two people's profiles generally results when people mutually agree to be directly related and notify the system of their agreement. An indirect link between a first person's profile and a second person's profile is present when they are not directly linked and a third person's profile is directly linked to both the first and second persons' profiles.

Social Networking Website—A website that implements a social network. Examples are Facebook, from Facebook, Inc. of Palo Alto, Calif., wherein a person linked to another person is known as a "friend" and LinkedIn, from LinkedIn Corporation of Santa Monica, Calif., wherein a person linked to another person is known as a "connection." The terms "friend," "connection," and "friend connection" are used generically and interchangeably herein.

Total Activity Weight—The combined value of all of the Activities, scaled by each associated Activity Weight, attributable to a given Promoter.

Total Weight—A value that influences how highly a particular website is ranked in search results generated by the systems and methods of the present invention. The Total Weight includes, as one element, the Total Activity Weight of the Promoter(s) for the website.

Uniform Resource Locator ("URL")—A string of letters and/or numbers that acts as the address of a source of content accessible through the Internet.

Uptime: The length of time that a computer is in continuous operation. The uptime ends when a computer is reset or shut down.

WHOIS—An Internet query/response communication protocol used for querying a domain registration database to determine the identity of a registrant of an Internet domain.

The present invention includes systems and methods for ranking websites in the search results of a keyword-based Internet search, based in part on Activities attributable to Promoters. Again, Promoters in the context of this invention are people, or more generally, entities, that seek to increase the prominence of a particular website, and more specifically, who wish to have the website appear higher and preferably first in search results. The method of calculating the ranking of one website relative to another is shown mathematically later in this disclosure. In short, the method is to sum the weights of a series of Activities, wherein each type of Activity has an Activity Weight assigned to it by the ASR Operator. The sum is called the Total Activity Weight. The Total Activity Weight is added to a score based on the Relevance of the content of each website in relation to keywords that might be entered by an End User. The sum of the Total Activity Weight and the Relevance score is referred to as the Total Weight. The Total Weight of a website controls how highly the website will be ranked in search results.

Another aspect of the invention is a method for updating the Total Activity Weight on a continuous basis, comprising: detecting the occurrence of an Activity attributable to a Promoter of a website; recording the Activity in a log; reviewing the log on a periodic basis, preferably every 30 minutes; calculating a new Total Activity Weight attributable to the Promoter, based on the Activities recorded in the log and an Activity Weight associated with each Activity; storing the new Total Activity Weight in a database that includes Total Activity Weight for Promoters; and making the updated database of indexes accessible to the search engine. In a further aspect, the invention includes the method disclosed above, with the further step of storing the new Total Activity Weight for all website URLs associated with the Promoter in a database that associates the Total Activity Weights of Promoters with website URLs.

The following are illustrative examples of Activities attributable to a Promoter. The occurrence of each Activity is recorded in the Activity log and taken into account in calculating an updated Total Activity Weight for the Promoter and an updated Total Weight for the websites associated with the Promoter.

Activity 1: The Activity of a Promoter logging into the ASR Operator's website.

Activity 2: The Activity of a Promoter logging into an ASR Affiliated Site.

Activity 3: The Activity of a Promoter opening an email sent to the Promoter's email address by the ASR Operator, which causes an electronic notification to be sent to the ASR Operator that the Promoter opened the email. This can be accomplished by including a web beacon in an email, as will be understood by people skilled in the art.

Activity 4: The Activity of a Promoter opening an email sent to the Promoter's email address by an ASR Affiliated Site, which causes an electronic notification to be sent either directly to the ASR Operator or to the ASR Affiliated Site, which then notifies the ASR Operator. Again, this can be accomplished by including a web beacon in an email, as will be understood by people skilled in the art.

Activity 5: The Activity of a Promoter opening an email sent by the ASR Operator to the Promoter's email address and clicking on a link in the email. When the Promoter clicks on the link, which could be encoded with the Promoter's ASRID or other identifying indicia, the ASR Operator receives a notification that the Promoter clicked on the link.

Activity 6: The Activity of a Promoter opening an email sent by an ASR Affiliated Site to the Promoter's email address and clicking on a link in the email. When the Promoter clicks on the link, which could be encoded with the Promoter's ASRID or other identifying indicia, an electronic notification is sent either directly to the ASR Operator or to the ASR Affiliated Site, which then notifies the ASR Operator.

Activity 7: The Activity of a Promoter opening an email sent by the ASR Operator to the Promoter's email address and clicking on a link in the email to purchase an item advertised in the email. When the Promoter purchases the item, the ASR Operator receives an electronic notification that the Promoter clicked on the link and purchased the item.

Activity 8: The Activity of a Promoter opening an email sent by an ASR Affiliated Site to the Promoter's email address and clicking on a link in the email to purchase an item advertised in the email. When the Promoter purchases the item, the ASR Operator receives an electronic notification that the Promoter clicked on the link and purchased the item. The notification is either sent directly to the ASR Operator, or indirectly, by way of the ASR Affiliated Site.

Activity 9: The Activity of a Promoter clicking on a link on the ASR Operator's website. Upon the Promoter clicking on a link, the ASR Operator detects this event and attributes it to the Promoter based on the IP address of the Promoter's computer, one or more cookies stored in the Promoter's web browser, or because the Promoter logged into the ASR Operator's website first.

Activity 10: The Activity of a Promoter clicking on a link on an ASR Affiliated Site. Upon the Promoter clicking on a link, the ASR Operator detects this event and attributes it to the Promoter based on the IP address of the Promoter's computer, one or more cookies stored in the Promoter's web browser, or because the Promoter logged into the ASR Operator's website first. As with many other Activities performed in conjunction with an ASR Affiliated Site, the ASR Operator may be directly notified of the Activity or indirectly notified by receiving information of the occurrence of the Activity from the ASR Affiliated Site.

Activity 11: The Activity of a Promoter submitting the URL of a website to the ASR Operator's URL submission system.

Activity 12: The Activity of a Promoter submitting personal or demographic information to the ASR Provider in response to a query for such information from the ASR Provider. Depending on the amount of personal or demographic information provided by the Promoter, the ASR Operator assigns more or less Activity Weight to this Activity, or counts it as multiple Activities.

Activity 13: The Activity of a Promoter submitting personal or demographic information to an ASR Affiliated Site in response to a query for such information from the ASR Affiliated Site. Depending on the amount of personal or demographic information provided by the Promoter, the ASR Operator, or in other embodiments, the ASR Affiliated Site, assigns more or less Activity Weight to this Activity, or counts it as multiple Activities.

Activity 14: The Activity of a Promoter performing a search through the ASR Operator's website or ASR Affiliated Site.

Activity 15: The Activity of a first Promoter referring a second Promoter to the ASR Operator. More specifically, this Activity is detected, recorded, and attributed to the first Promoter when the second Promoter registers with the ASR Operator through the ASR Operator's website or URL submission system and indicates, as part of the registration, that the first Promoter referred the second Promoter to the ASR Operator.

Activity 16: The Activity of a Promoter posting one or more reviews of or links to the ASR Operator's website or ASR Affiliated Site on one or more of the Promoter's websites or another website. In the normal course of operation, the ASR Operator's computer system periodically analyzes the content of a Promoter's website(s) for changes, working hyperlinks, and updated content. For example, the Activity Weight or the number of Activities recorded may correspond to the number of links to the ASR Operator's website discovered on the Promoter's website.

In an exemplary embodiment:
1. A Promoter places a link on the Promoter's website to the website of the ASR Operator.
2. The Promoter logs into to website of the ASR Operator and, through an online form, submits the URL of the Promoter's website, indicates where the link appears on the website, and where it points to.
3. The computer system of the ASR Operator spiders the webpage where the link should be, as indicated by the Promoter. If the ASR Operator's computer system finds the link, the ASR Operator's computer system increases the Promoter's Total Activity Weight.

In the context of a Promoter generating an online a review of the ASR Operator's website, the following is an exemplary embodiment of the process.
1. A Promoter places a review about the ASR Operator's website on a website.
2. The Promoter logs into to the ASR Operator's website and, through an online form, adds the URL where the review is and some of the wording of the review.
3. The computer system of the ASR Operator spiders the webpage where the review should be. If it finds the review, the computer system of the ASR Operator increases the Total Activity Weight of the Promoter.

Activity 17: The Activity of a Promoter adding links to ASR Affiliated Sites to one or more websites associated with the Promoter. As mentioned before, in the normal course of operation, the ASR Operator's computer system periodically analyzes the content of a Promoter's website(s) for changes, working hyperlinks, and updated content. For this Activity, the Activity Weight or the number of Activities recorded corresponds to the number of links to ASR Affiliated Sites discovered on the Promoter's website.

Activity 18: The Activity of a Promoter maintaining a website associated with the Promoter so well that an End User gives the website a high recommendation or high ranking. More specifically, on any of the Promoter's websites, the Promoter may include a section that allows an End User to click a button, specify a rating, or otherwise indicate that the website is of high quality and well supported, in the End User's opinion. This feedback is then transmitted to the ASR Operator's computer system.

Activity 19. The Activity of a Promoter making one or more friend connections within a social networking website, an ASR Affiliated Site or ASR Operator's Site. In one embodiment, the more friends that are added within a given time period, such as a day, the more weight that is given to the activity. In another embodiment, each friend added counts as an activity. For a social networking website that is not run by the ASR Operator's computer system and is not an ASR Affiliate Site, the ASR Operator's computer system will analyze activity report emails sent directly to it by a social networking site or which are forwarded from the Promoter to the ASR Operator's computer system. In preferred embodiments, the Promoter includes the Promoter's ASRID in the Promoter's profile on the social networking website.

The ASR Operator's computer system parses the email to determine how many friends the Promoter added, as reported in the email. In an alternative embodiment, the ASR Operator's computer system interacts directly with the social networking site directly and "views" the Promoter's set of friends or connections on a periodic basis and determines if the Promoter's set of friends or connections has grown. This can be done by accessing the social networking website and parsing the web pages, or by accessing the database of the social networking website with an Application Programming Interface ("API"). Where necessary, the ASR Operator's computer has a user account on the social networking website and is a friend or connection of the Promoter, allowing the ASR Operator's computer to access the pertinent information regarding the Promoter's actions on the social networking website.

Activity 20. The Activity of a Promoter removing one or more friend connections within a social networking website, an ASR Affiliated Site or ASR Operator's Site. The above discussion regarding how the ASR Operator's computer system detects a Promoter's addition of friend connections also applies to how it detects a Promoter's removal of one or more friend connections. The above discussion of counting Activities and assigning Activity Weights applies here as well.

Activity 21. The Activity of a Promoter sending an email or sending/posting a message within a social networking website, an ASR Affiliated Site or ASR Operator's Site. The above discussion regarding the ASR Operator's ability to detect occurrences on a social networking website applies here as well.

Activity 22. The Activity of a Promoter registering a domain name with a domain name registration company, an ASR Affiliated Site or ASR Operator's Site. In the context of a domain name registration company that is not affiliated with or otherwise in direct communication with the ASR Operator's computer system, in one embodiment, the Promoter may include the Promoter's ASRID in the WHOIS information for the domain. The Promoter then logs into to the ASR Operator's computer system and, through an online form, submits the name of the domain which the Promoter registered. The ASR Operator's computer system checks the WHOIS information for the domain and finds the Promoter's ASRID listed therein. As a result, the ASR Operator's computer system increases the Promoter's Total Activity Weight. In other embodiments, the domain registration company sends a notification that the Promoter registered the domain either directly to the ASR Operator's computer system, or to the Promoter, who then forwards it to the ASR Operator's computer system. In preferred embodiments, the notification includes the Promoter's ASRID.

Activity 23. The Activity of a Promoter creating an account with an ASR Affiliated Site or ASR Operator's Site.

Activity 24. The Activity of a Promoter posting pictures or comments to a social networking website, a news group, a blog site, an ASR Affiliated Site, or ASR Operator's Site.

Activity 25. The Activity of a Promoter writing and/or submitting a news release, a press release, an article, or a book. Such items are advertised and/or listed in different places on the Internet. In one embodiment, a Promoter adds the Promoter's ASRID in an article and when the computer systems of the ASR Operator finds/spiders the article with the Promoter's ASRID, the Promoter will receive credit in the form of an increased Total Activity Weight.

Activity 26. The Activity of a Promoter purchasing products and/or services from an ASR Affiliated Site or ASR Operator's Site.

Activity 27. The Activity of a Promoter maintaining his website to maximize uptime and/or minimize response times. The ASR Operator's computer system may test these conditions directly, by periodically attempting to access the Promoter's website and recording whether the website was accessible and how quickly the website responded. Alternatively, the ASR Operator's computer system may obtain such information from a third-party service. As an example, each time the accessibility and/or responsiveness of a Promoter's website is tested and the website is accessible and responds within a predetermined amount of time, an activity is recorded for the Promoter.

Activity 28. The Activity of Promoter having the Promoter's website monitored for availability, proper response codes, web traffic and/or analytical statistics. For example, the Promoter sends a notification to the computer system of the ASR Operator, telling it that the Promoter's website has been submitted to a third party's service for monitoring the website. In this embodiment, the Promoter submits to the Promoter's ASRID and the URL of the Promoter's website to the computer system of the ASR Operator. Subsequently, the computer system of the ASR Operator communicates with the third party's website for confirmation that the Promoter's website is indeed being monitored.

In another embodiment of the above Activity, the third party website monitoring company is more actively engaged in the process and pays fees to the ASR Operator to be licensed to generate activities for Promoters. In this embodiment, the third party monitoring company initiates communication with the computer system of the ASR Operator, sending an indication that the Promoter is performing activity, (e.g., having the Promoter's site monitored) by the third party website monitoring company. In the communication, the monitoring company identifies the Promoter by the Promoter's ASRID, allowing the computer system of the ASR Operator to update the Activity information for the Promoter. The third party monitoring company benefits because it gets more traffic on its site from Promoters wanting to increase their activity levels to get higher rankings in search results. The ASR Operator benefits by the third party monitoring company paying fees to the ASR Operator to be a company that is licensed to generate activities for Promoters. The Promoters benefit with a higher Total Activity Weight, as explained below, and as a result, higher rankings in search results.

It should be understood by those skilled in the art that the Activities of a Promoter can be detected and attributed to the Promoter based on the login session identification, the ASRID, the IP address of the Promoter's computer, the Promoter's email address, cookies stored in the Promoter's web browser, or software running locally on the Promoter's computer that monitors the Promoter's Internet traffic and/or mouse clicks or keystrokes. It should also be understood that any Activities taking place on an ASR Affiliated Site are reported directly by the ASR Affiliated Site to the ASR Operator's site.

The systems and methods of the present invention improve on the prior art as follows:

Benefits to End Users
1. Current, up-to-date information about products, services and content on the websites returned as search results.
2. Working websites with fewer dead links
3. Search results are from websites that are maintained on a regular basis.
4. Promoters provide better feedback from inquiries sent to the website by the End Users.

Benefits to Promoters
1. No direct costs to promote website(s)
2. Increased traffic
3. Increased visibility Benefits to ASR Operator
1. Increased website traffic
2. Increased number of Promoters that register with the ASR Operator
3. Increased demographics of Promoters
4. Increased traffic from Promoters
5. Increased email open rates, meaning that emails sent from the ASR
Operator to Promoters will be opened and read by Promoters
6. Increased Click Through rates
7. Increased Ad Impressions
8. Increased search activity
9. The ASR Operator will "see" people that it would not otherwise see. People (i.e., Promoters) who submit website URLs via SES Companies are generally not required to have to have an account with the search engines and as a result, the search engines do not have any information about the Promoters. The Promoters also do not generate much traffic for the search engines. They might do a quick search to see if their site is listed. With ASR technology, the Promoters will visit the ASR Operator's website regularly.

Each Activity is assigned a weight called an Activity Weight. When a Promoter is found to have a certain Activity, the weight for that Activity and all other defined Activities are summed and used to increase or decrease the ranking of the websites associated with the Promoter. The assignment of the Activity to Activity Weight is performed purely as a business decision. For example, if a business that is assigning Activity Weights to Activities decides that the Activity of logging into their website is worth an Activity Weight of 2, then an assignment of Activity Weight 2 will be assigned when a Promoter logs into the site. As a result, when a Promoter logs in, a 2 is added to the Promoter's Total Activity Weight. This process can be applied to any number of Activities.

In the equations disclosed hereinbelow, the following symbols are used:
Number of Activities of a given type—$\mu$
Total number of Activities—$\Psi$
Activity Weight—$\alpha$
Total Activity Weight—$\Omega$ The Total Activity Weight, Ω, is calculated as:

$$\Omega = \sum_{\mu=1}^{\yen} (\pi_\mu)$$

For the following discussion, one more symbol is used:
Relevance—Φ—The Relevance, Φ, is typically calculated by a conventional method.

The ranking of webpages in the search results are influenced by a combination of Ω and Φ. More specifically, the search results are ranked by the product or sum of Ω and Φ, as shown below. Also, if no Activity is found and if the product is used, Ω will be one and no adjustment will be made to the result. If the sum is used, then Ω will be zero and no adjustments will be made to the results. So, the final page ranking weight could be calculated in one of the following two ways:

Total Weight=Ω*Φ, where if the Total Activities Weight, Ω, is 0, it is changed to 1 in this equation.
Or Total Weight=Ω+Φ, where if the Total Activities Weight, Ω, is 0, it is 0.

Aspects of the Invention

One aspect of the invention is a method of ranking websites in a listing of search results in response to a search query, comprising the steps of:
  downloading content from websites and storing said content in a first computer database;
  indexing said websites in such a way that a relevance score can be calculated, said relevance score representing how closely the content of an indexed website matches criteria of a search query;
  associating a person with one or more websites and storing said association in a second computer database;
  assigning a positive or negative weight to each of one or more types of activities that could be performed by said person;
  receiving at least one electronic notification transmitted through a computer network, each notification indicating that said person performed at least one activity of a certain type at least once;
  for each activity indicated in the at least one electronic notification, adding the weight associated with the type of the activity to a total activity weight and storing said total activity weight in the second computer database, thereby associating indexed websites associated with the person with a total activity weight;
  receiving a search query;
  calculating a relevance score for each indexed website, based on the search query;
  calculating a total weight for each indexed website, wherein the total weight is based on the relevance score of the indexed website and any total activity weight associated with the website in the second computer database; and
  ranking the websites in a list by the total weight of each website.

In a further aspect, in the above-disclosed method, the total weight is the sum of the relevance score and any activity weight associated with the website in the second computer database.

A further aspect of the invention is the above-recited method wherein said types of activities are those in the enumerated listing of Activities provided earlier in this disclosure.

Another aspect of the invention is a system for ranking websites in a listing of search results in response to a search query, comprising:
  a computer or network of computers programmed with computer-executable instructions for:
  downloading content from websites and storing said content in a first computer database;
  indexing said websites in such a way that a relevance score can be calculated, said relevance score representing how closely the content of an indexed website matches criteria of a search query;
  associating a person with one or more websites and storing said association in a second computer database;
  assigning a positive or negative weight to each of one or more types of activities that could be performed by said person;
  receiving at least one electronic notification transmitted through a computer network, each notification indicating that said person performed at least one activity of a certain type at least once;
  for each activity indicated in the at least one electronic notification, adding the weight associated with the type of the activity to a total activity weight and storing said total activity weight in the second computer database, thereby associating indexed websites associated with the person with a total activity weight;
  receiving a search query;
  calculating a relevance score for each indexed website, based on the search query;
  calculating a total weight for each indexed website, wherein the total weight is based on the relevance score of the indexed website and any total activity weight associated with the website in the second computer database; and
  ranking the websites in a list by the total weight of each website.

In a further aspect, in the above-disclosed system, the total weight is the sum of the relevance score and any activity weight associated with the website in the second computer database.

A further aspect of the invention is the above-recited system wherein said types of activities are those in the enumerated listing of Activities provided earlier in this disclosure.

A further aspect of the invention is a method for improving the ranking of a particular website among a plurality of websites in a listing of search results generated by a search engine in response to a search query, comprising:
  using a first computer networked to a search engine that assigns a positive or negative weight to each of one or more types of activities performed by a person associated with the particular website that indicate that said person maintains and supports said particular website and incorporates said weight in ranking the particular website relative to a plurality of websites in generating a listing of search results in response to a search query,
  performing one or more of said types of activities.

A further aspect of the invention is the above-recited method wherein said types of activities are those in the enumerated listing of Activities provided earlier in this disclosure.

A further aspect of the invention is a method for improving the ranking of a particular website among a plurality of websites in a listing of search results generated by a search engine in response to a search query, comprising:

using a first computer networked to a search engine comprising:

a computer or network of computers programmed with computer-executable instructions for:

downloading content from websites and storing said content in a first computer database;

indexing said websites in such a way that a relevance score can be calculated, said relevance score representing how closely the content of an indexed website matches criteria of a search query;

associating a person with one or more websites and storing said association in a second computer database;

assigning a positive or negative weight to each of one or more types of activities that could be performed by said person;

receiving at least one electronic notification transmitted through a computer network, each notification indicating that said person performed at least one activity of a certain type at least once;

for each activity indicated in the at least one electronic notification, adding the weight associated with the type of the activity to a total activity weight and storing said total activity weight in the second computer database, thereby associating indexed websites associated with the person with a total activity weight;

receiving a search query;

calculating a relevance score for each indexed website, based on the search query;

calculating a total weight for each indexed website, wherein the total weight is based on the relevance score of the indexed website and any total activity weight associated with the website in the second computer database; and ranking the websites in a list by the total weight of each website, performing one or more of said activities.

A further aspect of the invention is the above-recited method wherein said types of activities are those in the enumerated listing of Activities provided earlier in this disclosure.

A further aspect of the invention is a method for querying a search engine for a listing a websites that are ranked by relevance to criteria specified in a search query and by the degree to which the websites are supported and maintained, comprising:

using a first computer networked to a search engine that assigns a positive or negative weight to each of one or more types of activities performed by a person associated with a particular website that indicate that said person maintains and supports said particular website and incorporates said weight in ranking the particular website relative to a plurality of websites in generating a listing of search results in response to a search query, submitting a search query to said search engine; and receiving said listing of websites that are ranked by relevance to criteria specified in a search query and by the degree to which the websites are supported and maintained.

A further aspect of the invention is the above-recited method wherein said types of activities are those in the enumerated listing of Activities provided earlier in this disclosure.

A further aspect of the invention is a method for querying a search engine for a listing a websites that are ranked by relevance to criteria specified in a search query and by the degree to which the websites are supported and maintained, comprising:

using a first computer networked to a search engine comprising:

a computer or network of computers programmed with computer-executable instructions for:

downloading content from websites and storing said content in a first computer database;

indexing said websites in such a way that a relevance score can be calculated, said relevance score representing how closely the content of an indexed website matches criteria of a search query;

associating a person with one or more websites and storing said association in a second computer database;

assigning a positive or negative weight to each of one or more types of activities that could be performed by said person;

receiving at least one electronic notification transmitted through a computer network, each notification indicating that said person performed at least one activity of a certain type at least once;

for each activity indicated in the at least one electronic notification, adding the weight associated with the type of the activity to a total activity weight and storing said total activity weight in the second computer database, thereby associating indexed websites associated with the person with a total activity weight;

receiving a search query;

calculating a relevance score for each indexed website, based on the search query;

calculating a total weight for each indexed website, wherein the total weight is based on the relevance score of the indexed website and any total activity weight associated with the website in the second computer database; and ranking the websites in a list by the total weight of each website, submitting a search query to said search engine; and receiving said listing of websites that are ranked by relevance to criteria specified in a search query and by the degree to which the websites are supported and maintained.

A further aspect of the invention is the above-recited method wherein said types of activities are those in the enumerated listing of Activities provided earlier in this disclosure.

These and other aspects of the present invention will become readily apparent from the following detailed description taken in conjunction with the accompanying drawings.

DETAILED DESCRIPTION

Figure 1:
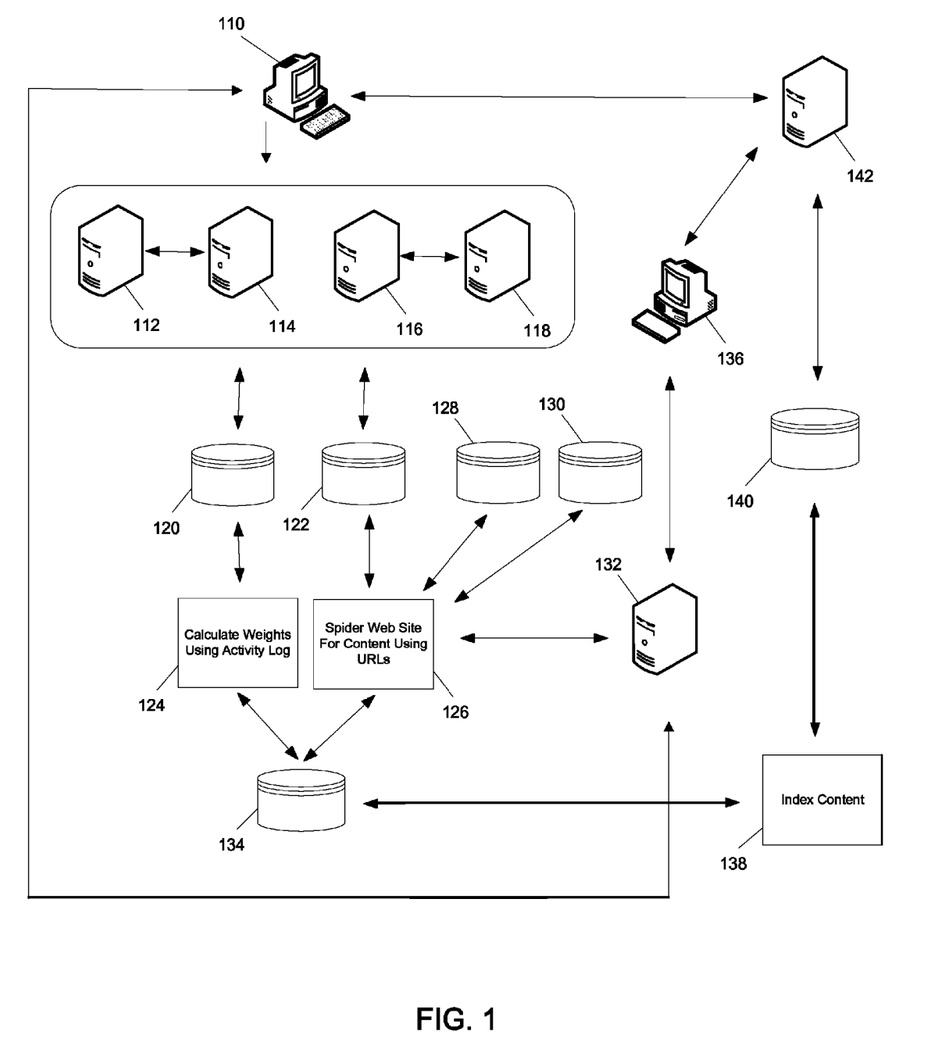
FIG. 1 is a diagram showing components of an embodiment of the present invention as well as how the components interact with one another.

FIG. 1 is a diagram showing the components of an embodiment of the present invention and generally how the components interact with one another. A Promoter's Computer 110 is connected with the ASR Operator's Activity Tracking System 114, which is a computer or network of computers carrying out computer-executable instructions for tracking Activities performed by the Promoter. The ASR Operator's Activity Tracking System 114 is connected with an ASRAS Activity Tracking System 112. The ASRAS Activity Tracking System tracks Promoters' Activities performed in connection with the ASRAS and reports the Activities to the ASR Operator's Activity Tracking System 114 on a regular basis. The Activity Weight for each Activity that a Promoter can perform through the ASRAS is determined by the ASRAS. In other embodiments, the ASR Operator determines the Activity Weight of each Activity performed in association with the ASRAS. It is to be understood that in other embodiments, there may be multiple ASRAS's or no ASRAS's.

The Promoter's Computer 110 is also connected with the ASR Operator's URL Submission System 116, which provides a webpage interface through which the Promoter can submit the URL for Promoter's Website 132, which the Promoter is promoting. It should be understood that a Promoter may be associated with multiple websites. In order to submit the URL through the ASR Operator's URL Submission System 116, the Promoter must be registered with the ASR Operator. The Promoter registers with the ASR Operator through a webpage which requires contact information and gives the Promoter the option of providing additional, but non-required information, regarding the Promoter's age, gender, income, purchasing habits, the company the Promoter is associated with, and other information that the ASR Operator might find useful for obtaining demographic information about Promoters. In some embodiments, the ASR Operator may sell or license this information to online marketing companies. By registering with the ASR Operator, the Promoter is assigned an Active Search Results Identification Number, or ASRID. The Promoter is incentivized to provide the non-required information during registration because answering each question counts as an Activity, which, as explained herein, increases the search results rankings for the website(s) that the Promoter is associated with.

The Promoter's Computer 110 is also connected with a Search Engine Submission Company's Website 118, which allows the Promoter to submit the URL of a website without providing any information regarding the identity of the Promoter. The Search Engine Submission Company's Website 118 is connected with the ASR Operator's URL Submission System 116, and through this connection, it transmits URL's submitted anonymously to the ASR Operator's URL Submission System 116. Activities, such as maintaining and updating the Promoter's Website 132, fixing dead links on the Promoter's Website 132, and responding to customer inquiries posted to the Promoter's Website 132 can still be associated with and credited to the Promoter even though the Promoter submitted the URL of the Promoter's Website 132 anonymously. This association is possible if the ASRID of the Promoter is included as a meta tag in the HTML of the webpages accessible on the Promoter's Website 132.

The ASR Activity Tracking System 114 records instances of Activities in Activity Log 120. The information recorded for each Activity includes the ASRID of the Promoter associated with the Activity and the Activity Weight for the Activity. Additional information may include, but is not limited to, the website on which the Activity occurred and the time and date that the Activity occurred. The Activity Log 120 is one or more flat files or, preferably, a structured query language ("SQL")-addressable relational database. It should be understood that the Activity Log 120 can exist in the memory of one particular computer or be distributed across multiple computers. The ASR Operator's computer systems calculate Total Activity Weights for each Promoter registered with the ASR Operator on a continual basis. As disclosed previously, and as shown at block 124, the Total Activity Weight for a given Promoter is calculated by multiplying each Activity by its respective Activity Weight, and summing the results. This step may be carried out by the ASR Operator's Activity Tracking System, or one or more separate computers with access to the Activity Log 120. The ASR Operator's computer systems store the calculated Total Activity Weights in the Weights and Content Database 134.

The ASR Operator's URL Submission System 116 records URLs of websites submitted to it from the Promoter 110 and the Search Engine Submission Company's Website 118 in the Submitted URL Database 122. Like the Activity Log 120, the Submitted URL Database 122 is one or more flat files or, preferably, a SQL-addressable relational database. It should be understood that the Submitted URL Database 122 can exist in the memory of one particular computer or be distributed across multiple computers. The ASR Operator's computer systems are connected to the Submitted URL Database 122, as well as a Discovered URL Database 128, and an outside database of registered domains, such as one maintained by an Internet domain registrar 130, and the websites addressable by the URLs. One such website is the Promoter's Website 132.

An important function carried out by the computer systems of the ASR Operator is acting as a Spider to and downloading the content of into websites located at URLs in the Submitted URL Database 122 into the Weights and Content Database 134. While downloading website content during this process, the computer systems of the ASR Operator may come across URLs acting as links to other websites in the content. The ASR Operator's computer systems store these URLs into the Discovered URL Database 128. Another source of URLs that the ASR Operator's computer systems may draw upon is a database maintained by an Internet domain registrar 130.

With Total Activity Weights and website content stored in the Weights and Content Database 134, the ASR Operator's computer system indexes the content using methods known in the prior art. The indexing process, as will be understood by a person skilled in the art of search engines, generates information for determining a website's Relevance to a particular keyword or combination of keywords. This step is shown at block 138. The ASR Operator's computer system stores the indexed content, along with the associated URL for the website content, and the Total Activity Weight, if any, for each website URL in the Indexed Content and Weights Database 140.

The ASR Operator's Website 142 presents a web interface to an End User via the End User's Computer 136. The web interface allows the End User to enter a keyword-based search query. When the End User enters a keyword-based search query, End User's Computer 136 transmits the query to ASR Operator's Website 142 which determines the Relevance of the keywords to the content of websites in the Indexed Content and Weights Database 140. This process is known in the art. However the ASR Operator's Website 142 also factors in the Total Activity Weight of each indexed website to arrive at a Total Weight for each indexed website. The Total Weights dictate how highly ranked each indexed website will be in a listing of search results returned to End User's Computer 136. If a link to Promoter's Website 132 comes up as one of the highly ranked search results, the End User might click on the link, causing End User's Computer 136 to communicate with and receive content from Promoter's Website 132.

Figure 2:
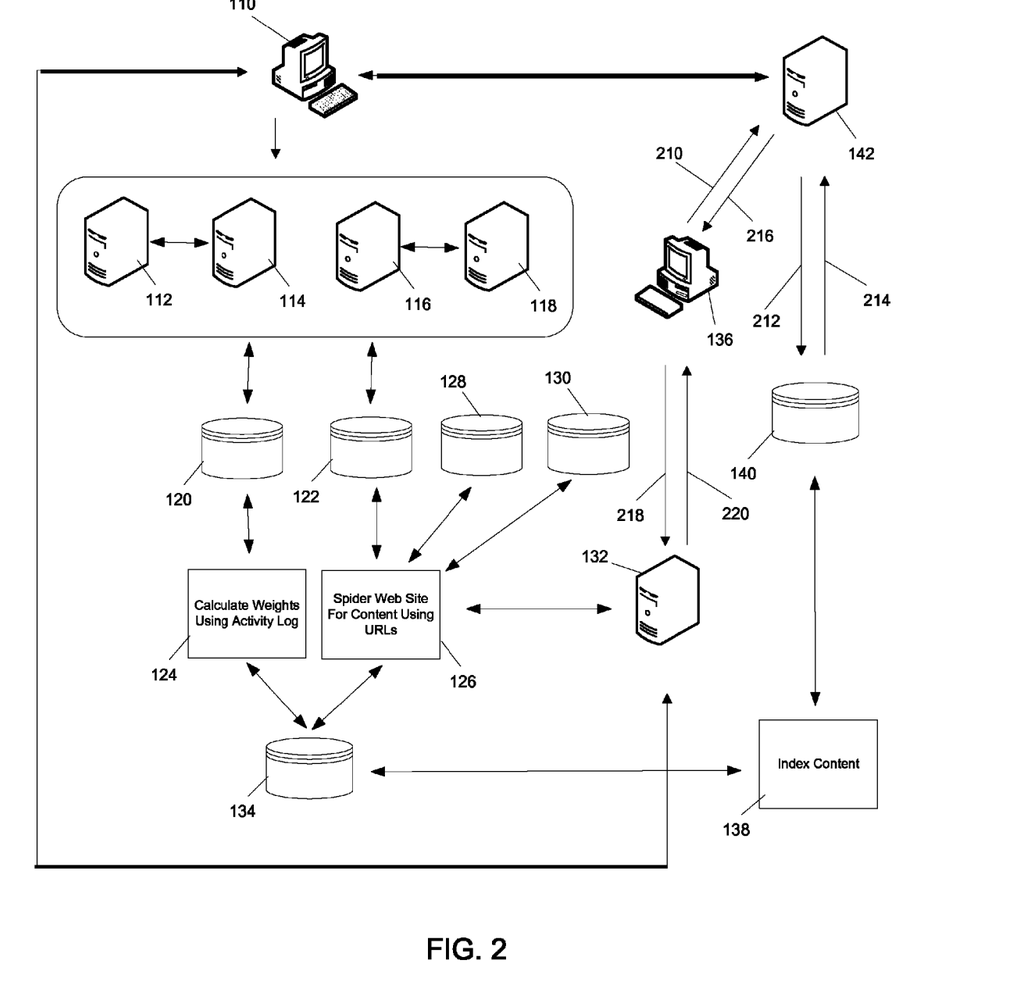
FIG. 2 is a diagram showing the components of FIG. 1 with an emphasis on the interaction between components when an End User enters a search query.

FIG. 2 is a diagram showing the components of FIG. 1 with an emphasis on the interaction between components when an End User enters a search query. At step 210, the End User, using a web browser such as Internet Explorer or Firefox running on End User's Computer 136, enters the URL for ASR Operator's Website 142 and is presented with a web interface for entering a keyword-based search query. The End User enters a query which End User's Computer 136 transmits to the ASR Operator's Website 142. At step 212, the ASR Operator's Website 142 queries the Indexed Content and Weights Database 140 for a list of website URLs in descending order of Total Weights based on the Total Activity Weight and keyword relevancy for each indexed website. The Indexed Content and Weights Database 140 transmits the sorted list to the ASR Operator's Website 142 at step 214. The ASR Operator's Website 142 formats the list into a webpage and transmits it to End User's Computer 136 at step 216. At step 218, the End User sees the list and clicks on a link to Promoter's Website 132, causing the End User's Computer 136 to query the Promoter's Website 132 for content. At step 220, the Promoter's Website 132 sends content to the End User's Computer 136, which is displayed on the End User's web browser.

Figure 3:
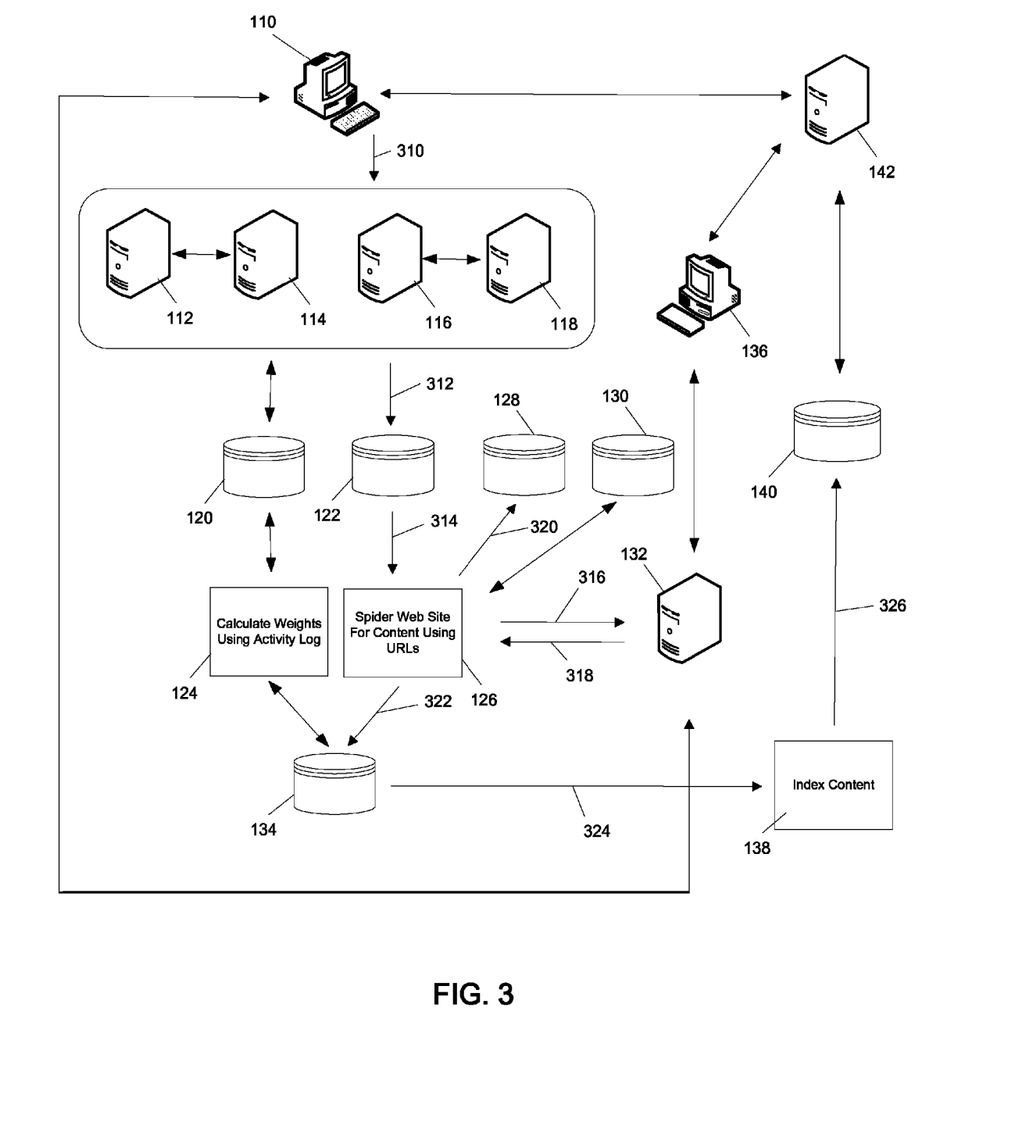
FIG. 3 is a diagram showing the components of FIG. 1 with an emphasis on the interaction between components when a Promoter submits the URL of the Promoter's website directly to the ASR Operator's URL Submission System.

FIG. 3 is a diagram showing the components of FIG. 1 with an emphasis on the interaction between components when a Promoter submits the URL of the Promoter's Website 132 directly to the ASR Operator's URL Submission System 116. At step 310, the Promoter, using a web browser running on the Promoter's Computer 110, enters the URL for the ASR Operator's URL Submission System 116 and is presented with a web interface for entering a URL. Still at step 310, the Promoter enters the URL for Promoter's Website 132. The ASR Operator's URL Submission System 116 receives that URL and, at step 312, stores it in the Submitted URL Database 122. At step 314, the ASR Operator's computer system retrieves the URL from the Submitted URL Database 122, and acting as a Spider, requests content from the Promoter's Website 132 at step 316 and receives and stores it at step 318.

The ASR Operator's computer system scans the downloaded content for additional URLs and stores any and all discovered URLs in the Discovered URLs Database 128, at step 320. At step 322, the ASR Operator's computer system stores the downloaded content in the Weights and Content Database 134. At step 324, the ASR Operator's computer system indexes the content using methods known in the prior art. The indexing process, as will be understood by a person skilled in the art of search engines, generates information for determining a website's Relevance to a particular keyword or combination of keywords. This is shown at block 138. At step 326, the ASR Operator's computer system stores the indexed content for the Promoter's Website 132 in the Indexed Content and Weights Database 140.

Figure 4:
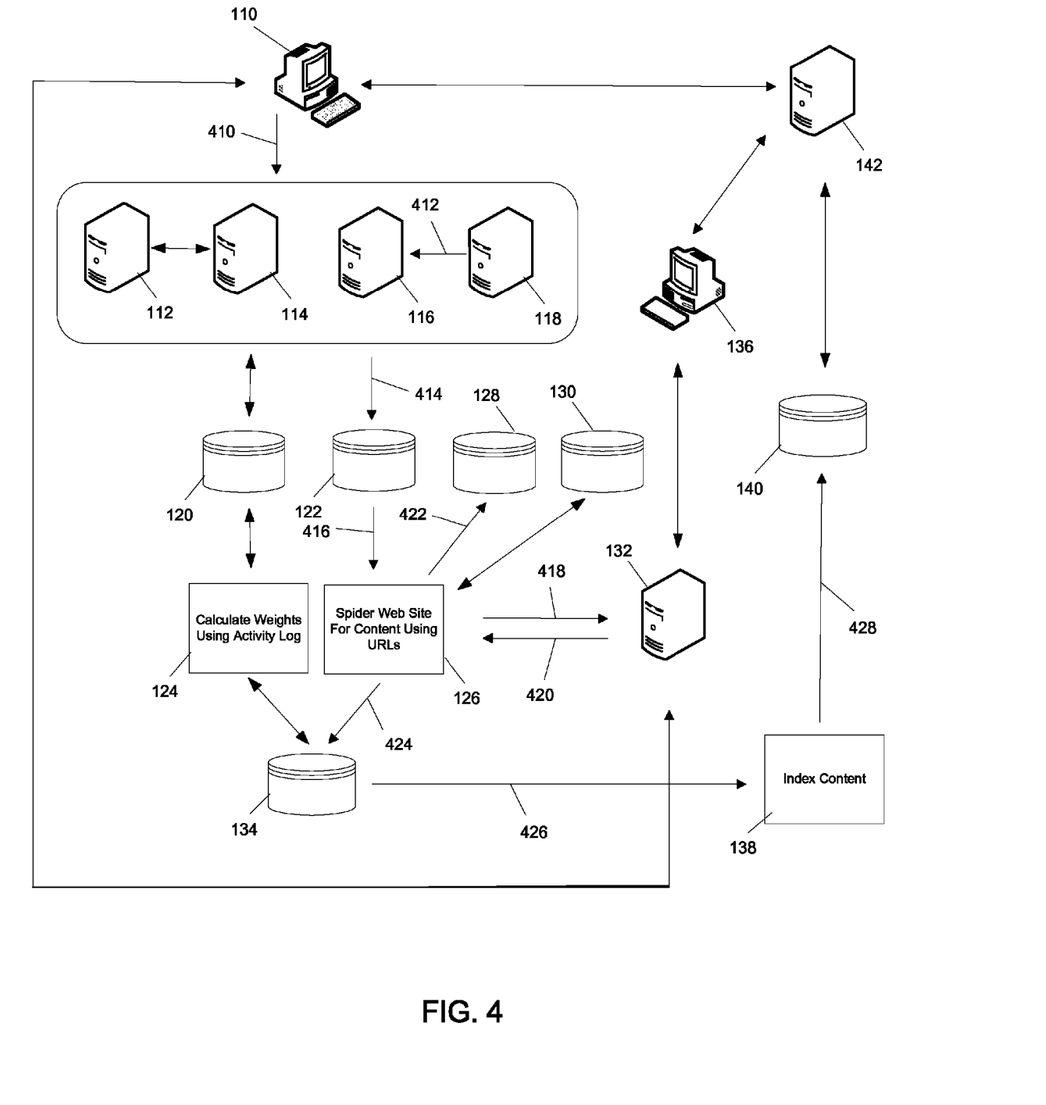
FIG. 4 is a diagram showing the components of FIG. 1 with an emphasis on the interaction between components when a Promoter submits the URL of the Promoter's website through a Search Engine Submission Company.

FIG. 4 is a diagram showing the components of FIG. 1 with an emphasis on the interaction between components when a Promoter submits the URL of the Promoter's Website 132 through a Search Engine Submission Company. At step 410, the Promoter, using a web browser running on the Promoter's Computer 110, enters the URL for the Search Engine Submission Company's Website 118 and is presented with a web interface for entering a URL. Still at step 410, the Promoter enters the URL for Promoter's Website 132. The Search Engine Submission Company's Website 118 receives that URL and transmits it to the ASR Operator's URL Submission System 116, at step 412.

At step 414, the ASR Operator's URL Submission System 116 stores the URL in the Submitted URL Database 122. At step 416, the ASR Operator's computer system retrieves the URL from the Submitted URL Database 122, and acting as a Spider, requests content from the Promoter's Website 132 at step 418 and receives and stores it at step 420. The ASR Operator's computer system scans the downloaded content for additional URLs and stores any and all discovered URLs in the Discovered URLs Database 128, at step 422. At step 424, the ASR Operator's computer system stores the downloaded content in the Weights and Content Database 134. At step 426, the ASR Operator's computer system indexes the content using methods known in the prior art. The indexing process, as will be understood by a person skilled in the art of search engines, generates information for determining a website's Relevance to a particular keyword or combination of keywords. This is shown at block 138. At step 428, the ASR Operator's computer system stores the indexed content for the Promoter's Website 132 in the Indexed Content and Weights Database 140.

Figure 5:
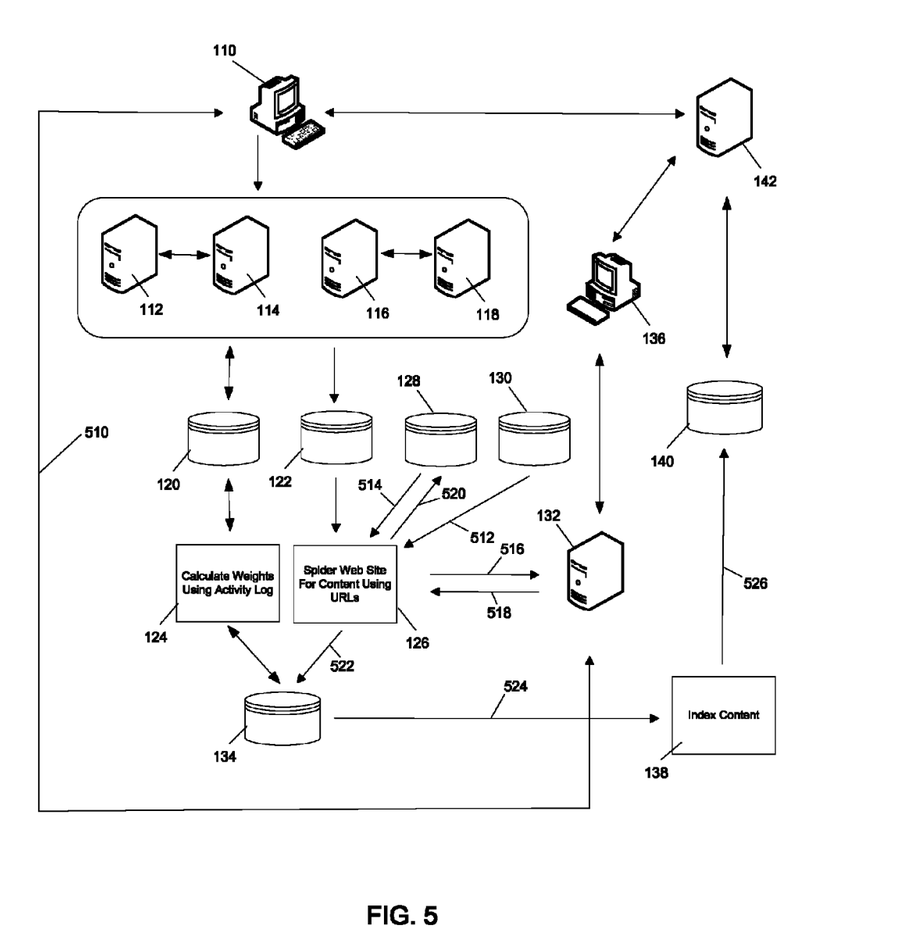
FIG. 5 is a diagram showing the components of FIG. 1 with an emphasis on the interaction between components when a Promoter promotes a website without submitting the URL of the Promoter's website to a search engine.

FIG. 5 is a diagram showing the components of FIG. 1 with an emphasis on the interaction between components when a Promoter promotes a website without submitting the URL of the Promoter's website to the ASR Operator's URL Submission System 116 or a Search Engine Submission Company's Website 118. At step 510, the Promoter, using the Promoter's Computer 110, edits existing content or uploads new content to Promoter's Website 132. As part of this step, the Promoter includes its ASRID as a meta tag in the HTML of the content on Promoter's Website 132. In other embodiments, the Promoter may not have previously registered with the ASR Operator and therefore has no ASRID to insert as a meta tag.

At step 512, the ASR Operator's computer system retrieves the URL of the Promoter's Website 132 during a regularly scheduled query for URLs from a URL database maintained by a domain registrar 130. Alternatively, during a regularly scheduled query of URLs found while scanning downloaded content for URLs, step 514, the ASR Operator's computer system might come retrieve the URL of the Promoter's Website 132 from the Discovered URLs Database 128. In either case, the ASR Operator's computer system acts as a Spider and requests content from the Promoter's Website 132 at step 516 and receives and stores the content at step 518. The ASR Operator's computer system scans the downloaded content for additional URLs and stores any and all discovered URLs in the Discovered URLs Database 128, at step 520. At step 522, the ASR Operator's computer system stores the downloaded content in the Weights and Content Database 134. At step 524, the ASR Operator's computer system indexes the content using methods known in the prior art, as discussed with regard to FIGS. 3 and 4, this process is represented at block 138. At step 526, the ASR Operator's computer system stores the indexed content for the Promoter's Website 132 in the Indexed Content and Weights Database 140.

Figure 6:
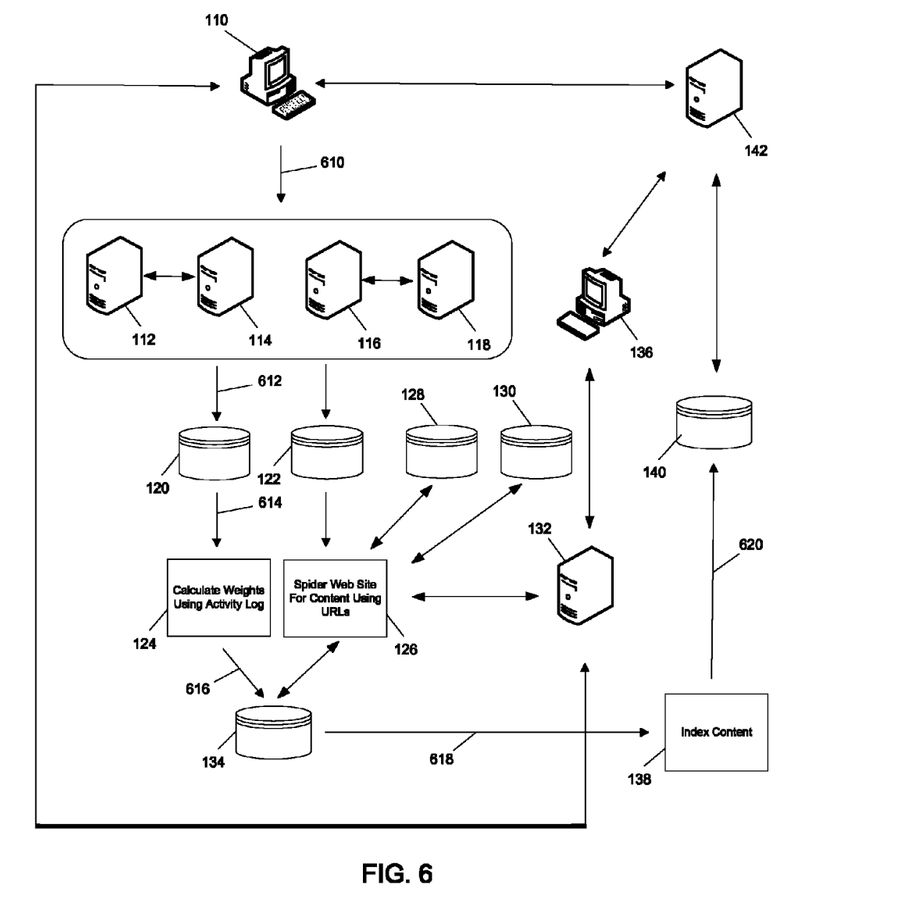
FIG. 6 is a diagram showing the components of FIG. 1 with an emphasis on the interaction between components when a Promoter performs an Activity that increases the Promoter's Total Activity Weight and the Total Weight of the Promoter's website.

FIG. 6 is a diagram showing the components of FIG. 1 with an emphasis on the interaction between components when a Promoter performs an Activity that increases the Promoter's Total Activity Weight and the Total Weight of the Promoter's Website 132. At step 610, the Promoter through the Promoter's Computer 110 performs an Activity that is noticed by the ASR Operator's Activity Tracking System 114. For purposes of this example, the Activity was that the Promoter opened an email sent to the Promoter by the ASR Operator. A web beacon contained in the email indicated to the ASR Operator's Activity Tracking System 114 that the email was opened and that the Promoter is actively reviewing emails. The methods by which web beacons work is well known to those skilled in the art and will not be discussed herein. At step 612, the ASR Operator's Activity Tracking System 114 records the occurrence of Activity, including the Activity Weight and the Promoter's ASRID, in the Activity Log 120.

The Activity Weight can be any non-zero number, including negative numbers. In this example, the Activity Weight is 1.2. At step 614, the ASR Operator's computer system queries the Activity Log 120 for new Activities and as shown as item 124, calculates the increase in the Total Activity Weights for Promoters. In this example, the Promoter's Total Activity Weight increases by 1.2. The ASR Operator's computer system queries the Activity Log 120 for new Activities on a periodic basis, which in this example is every 30 minutes. At step 616, the ASR Operator's computer system adds 1.2 to the Promoter's existing Total Activity Weight in the Weights and Content Database 134. At step 618, the ASR Operator's computer system performs a scheduled query of the Weights and Content Database 134 for newly added data. At item 138, the ASR Operator's computer system performs a scheduled indexing of any newly added content to the Weights and Content Database 134. At step 620, the ASR Operator's computer system stores any newly indexed content in the Indexed Content and Weights Database 140 and adds the newly calculated Total Activities Weight to the Total Weight for all websites associated with the Promoter's ASRID.

The above-described embodiments are intended to illustrate the principles of the invention, but not to limit its scope. Other embodiments and variations will be apparent to those skilled in the art and may be made without departing from the spirit and scope of the invention. However, due to the intense amount processing, indexing, and information transmission required to carry out the methods of the present invention, it should be easily understood that computers and computer networks are integral to and necessary for carrying out the methods disclosed herein.

Further, it is to be understood that all communication between computers and databases as disclosed herein is possible because they are connected together as part of the same computer or networked together via a wired or wireless network. It should also be understood that the databases discussed herein could be embodied in one or more flat files or in relational databases, and that they could be stored in the memory of one computer or distributed across multiple computers. It should also be understood that the method of calculating the Relevance score of a website, but not the Total Activity Weight or the Total Weight, is based on prior art methods and is not limited to keyword-based queries.

The invention claimed is:

1. A system for ranking websites comprising:
   a first computer database comprising machine-readable memory having website indexing records, each website indexing record comprising an indexed website ID and website indexing information;
   a second computer database comprising machine-readable memory having total activity records, each total activity record comprising an activity website ID and a total activity weight;
   a third computer database comprising machine-readable memory having activity records, each activity record comprising:
   an affiliated website ID,
   a website promoter ID associated with the affiliated website ID, the website promoter ID identifying a human website promoter,
   a website activity ID, the website activity ID identifying a website activity, the website activity being performed by the website promoter, and
   an activity weight for the website activity;
   a tracking system comprising a tracking system network connection and one or more tracking system processors, the one or more tracking system processors having computer-executable instructions for:
   tracking the website activities through the tracking system network connection,
   assembling tracked activity records, and
   transmitting the tracked activity records through the tracking system network connection;
   a search engine computer network having a search engine network connection and one or more search engine processors, the one or more search engine processors having computer-executable instructions for:
   receiving a search query through the search engine network connection into the one or more search engine processors, the search query comprising search criteria;
   transmitting a request for the website indexing records from the one or more search engine processors to the first computer database;
   receiving the website indexing records from the first computer database into the one or more search engine processors;
   calculating a relevance score for each indexed website ID by the one or more search engine processors, the relevance score being based on the search criteria and the website indexing information of each website indexing record;
   transmitting a request for the total activity records from the one or more search engine processors to the second computer database;
   receiving the total activity records from the second computer database into the one or more search engine processors;
   matching the website indexing records with the total activity records by comparing the indexed website IDs to the activity website IDs by the one or more search engine processors;
   calculating a total weight for each indexed website ID by the one or more search engine processors, the total weight being based on the relevance score of the indexed website ID and the total activity weight in the matching total activity record;
   assembling a list of the indexed website IDs ranked by the total weight of each indexed website ID by the one or more search engine processors;
   transmitting a request for the activity records from the one or more search engine processors to the third computer database;
   receiving the requested activity records into the one or more search engine processors from the third computer database;
   and for each requested activity record received:
   transmitting a request for a total activity record from the one or more search engine processors to the second computer database, the request comprising the affiliated website ID of the requested activity record;
   receiving the requested total activity record from the second computer database into the one or more search engine processors, wherein the activity website ID of the requested total activity record is identical to the affiliated website ID of the requested activity record;

calculating a new total activity weight from the sum of the activity weight of the requested activity record and the total activity weight of the requested total activity record by the one or more search engine processors; and transmitting the new total activity weight from the one or more search engine processors to the second computer database.

2. The system of claim 1, wherein the total weight for each indexed website ID is the sum of the relevance score of the indexed website ID and the total activity weight in the matching total activity record.

3. The system of claim 1, wherein the website activity of each activity record is selected from the group consisting of:
the website promoter logging into a tracked website;
the website promoter opening a tracked email;
the website promoter clicking on a tracked email hyperlink in the tracked email;
the website promoter clicking on a tracked website hyperlink on the webpage content transmitted by the tracked website;
the website promoter uploading personal information to the tracked website;
the website promoter submitting a tracked search query to the tracked website;
the website promoter uploading a review of an affiliated website to the tracked website;
the website promoter publishing a tracked promoter hyperlink on a promoted webpage, the tracked promoter hyperlink being enabled to transmit a tracked request for webpage content to the tracked website;
the website promoter making a tracked relationship with another person through a tracked online social networking platform;
the website promoter removing the tracked relationship;
the website promoter sending a tracked message through the tracked online social networking platform;
the website promoter registering a domain name on a tracked domain name registry;
the website promoter creating a tracked account with the tracked website; and
the website promoter uploading tracked content to the tracked website.

4. A method for ranking of websites comprising:
receiving a search query through a search engine network connection into one or more search engine processors, the search query comprising search criteria;
transmitting a request for website indexing records from the one or more search engine processors to a first computer database, the first computer database comprising machine-readable memory having website indexing records, each website indexing record comprising an indexed website ID and website indexing information;
receiving the website indexing records from the first computer database into the one or more search engine processors;
calculating a relevance score for each indexed website ID by the one or more search engine processors, the relevance score being based on the search criteria and the website indexing information of each website indexing record;
transmitting a request for total activity records from the one or more search engine processors to a second computer database, the second computer database comprising machine-readable memory having total activity records, each total activity record comprising an indexed website ID and a total activity weight;
receiving the total activity records from the second computer database into the one or more search engine processors;
matching the website indexing records with the total activity records by comparing the indexed website IDs to the activity website IDs by the one or more search engine processors;
calculating a total weight for each indexed website ID by the one or more search engine processors, the total weight being based on the relevance score of the indexed website ID and the total activity weight in the matching total activity record;
assembling a list of the indexed website IDs ranked by the total weight of each indexed website ID by the one or more search engine processors;
transmitting a request for one or more recordable activity records from the one or more search engine processor to a third computer database, the third computer database comprising machine-readable memory having activity records, each recordable activity record having been generated and transmitted from a tracking system to the third computer database, each recordable activity record comprising:
an affiliated website ID,
a website promoter ID associated with the affiliated website ID, the website promoter ID identifying a human website promoter,
a website activity ID, the website activity ID identifying a website activity, the website activity being performed by the website promoter, and
an activity weight for the website activity;
wherein the tracking system comprises one or more general purpose tracking computers having a tracking system network connection and one or more tracking system processors, the one or more tracking system processors having computer-executable instructions for:
tracking the website activities through the tracking system network connection,
assembling tracked activity records, and
transmitting the tracked activity records through the tracking system network connection;
receiving the one or more recordable activity records through the search engine network connection into the one or more search engine processors,
and for each recordable activity record received:
transmitting a request for a total activity record from the one or more search engine processors to the second computer database, the request comprising the affiliated website ID of the recordable activity record;
receiving the requested total activity record from the second computer database into the one or more search engine processors, wherein the activity website ID of the requested total activity record is identical to the affiliated website ID of the recordable activity record;
calculating a new total activity weight from the sum of the activity weight of the recordable activity record and the total activity weight of the requested total activity record by the one or more search engine processors; and
transmitting the new total activity weight from the one or more search engine processors to the second computer database.

5. The method of claim 4, wherein the website activity of each of the one or more recordable activity records is selected from the group consisting of:
the website promoter logging into a tracked website;
the website promoter opening a tracked email;
the website promoter clicking on a tracked email hyperlink in the tracked email;

the website promoter clicking on a tracked website hyperlink on the webpage content transmitted by the tracked website;

the website promoter uploading personal information to the tracked website;

the website promoter submitting a tracked search query to the tracked website;

the website promoter uploading a review of an affiliated website to the tracked website;

the website promoter publishing a tracked promoter hyperlink on a promoted webpage, the tracked promoter hyperlink being enabled to transmit a tracked request for webpage content to the tracked website;

the website promoter making a tracked relationship with another person through a tracked online social networking platform;

the website promoter removing the tracked relationship;

the website promoter sending a tracked message through the tracked online social networking platform;

the website promoter registering a domain name on a tracked domain name registry;

the website promoter creating a tracked account with the tracked website; and the website promoter uploading tracked content to the tracked website.

\* \* \* \* \*